No. 780,916. PATENTED JAN. 24, 1905.
M. W. SAXON.
COUNTING DEVICE.
APPLICATION FILED MAR. 12, 1904.

Inventor
Mitchell W. Saxon,

Witnesses
Geo. Ackman Jr.
Chas. S. Hyer.

By Victor J. Evans
Attorney

No. 780,916. Patented January 24, 1905.

UNITED STATES PATENT OFFICE.

MITCHELL W. SAXON, OF BUFFALO, WYOMING.

COUNTING DEVICE.

SPECIFICATION forming part of Letters Patent No. 780,916, dated January 24, 1905.

Application filed March 12, 1904. Serial No. 197,854.

*To all whom it may concern:*

Be it known that I, MITCHELL W. SAXON, a citizen of the United States, residing at Buffalo, in the county of Johnson and State of Wyoming, have invented new and useful Improvements in Counting Devices, of which the following is a specification.

This invention relates to a device for counting sheep, goats, and other small animals; and the primary object of the same is to provide simple and effective means for accurately counting and registering the number of animals passing thereover and relieve stock raisers and others of the annoyance incident to keeping tally of a number of sheep or other animals passing a certain point, the device facilitating the operation of counting animals, especially on large stock-farms or ranches where such operation is necessary and required to be expeditiously pursued to permit animals to be liberated for early feeding.

The improved device is also adapted for use in sheep-shearing and dipping plants and counting-corrals.

The invention consists in the construction and arrangement of the several parts, which will be more fully hereinafter set forth.

Figure 1:
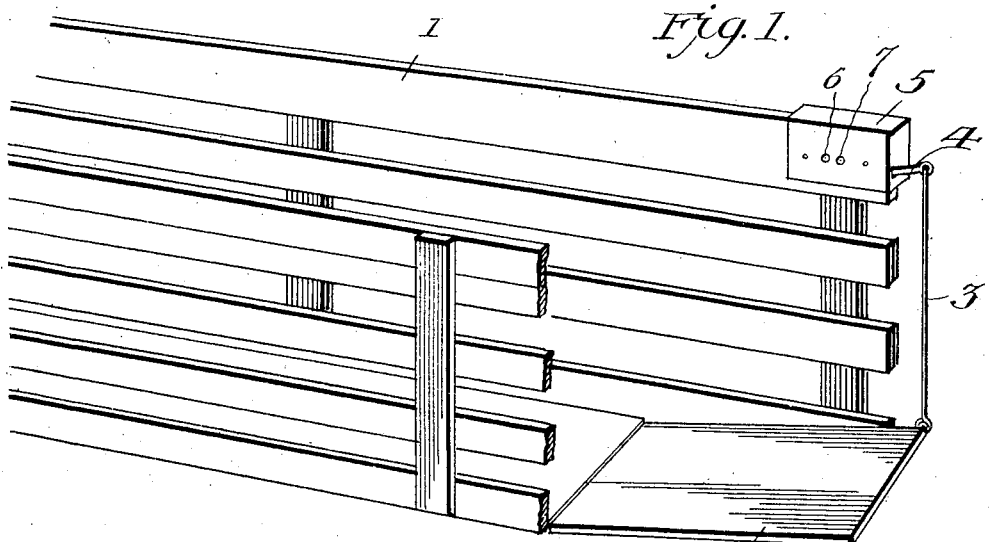
Figure 2:
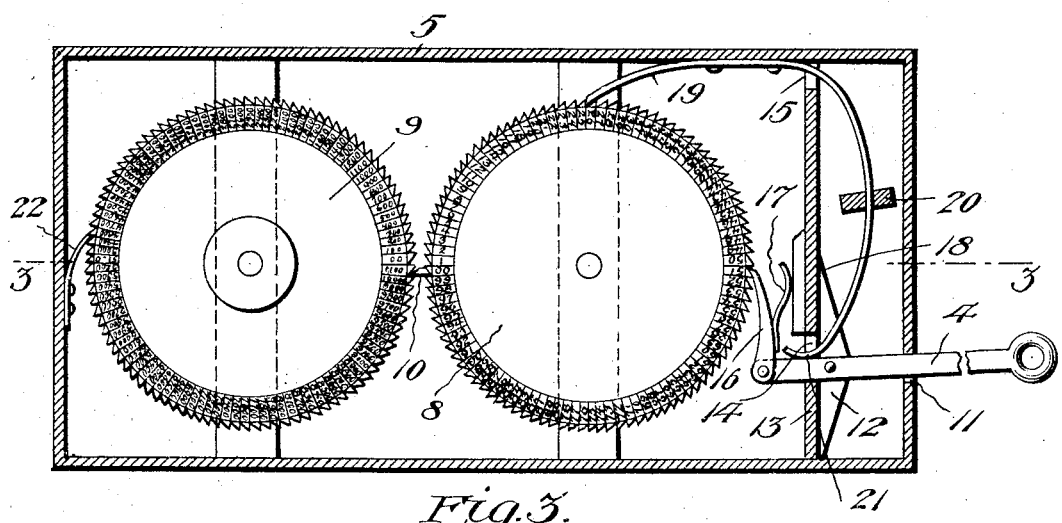
Figure 3:
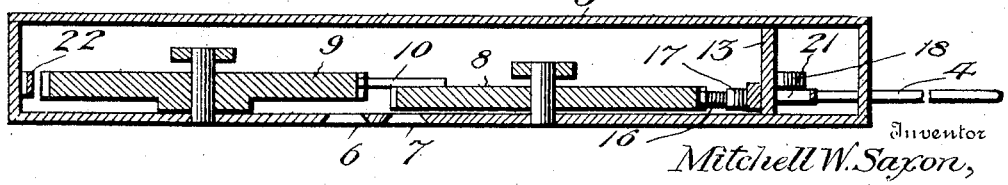

In the drawings, Figure 1 is a perspective view of a device embodying the features of the invention and shown partially broken away. Fig. 2 is a longitudinal vertical section of the registering mechanism for the device. Fig. 3 is a horizontal section on the line 3 3, Fig. 2.

Similar numerals of reference are employed to indicate corresponding parts in the several views.

The numeral 1 designates a chute of that class usually employed in loading and unloading stock or for transferring stock from one point to another and in the present instance is used to render the essential features of the invention effective in operation. A tilting platform 2 is attached to one end of the floor of the chute 1 and is normally held at an upward angle of inclination relatively to said floor. The free end of this platform is located adjacent to the outlet end of the chute and extends slightly beyond the latter. Attached to one side of the free end of the platform is a connecting-rod 3, which projects upwardly and is movably attached to one end of an operating-lever 4, projecting into a register-box 5, secured on the upper part of one side of the chute adjacent to the platform and having side openings 6 and 7 in the inner face thereof to display the numbers that will be presented in rear thereof by the registering mechanism arranged in the box or casing 5.

The registering mechanism in the box or casing 5 consists of a toothed wheel or disk 8, which coöperates with a second toothed wheel or disk 9, the first wheel being provided with one hundred teeth, which are numbered consecutively from "1" to "100." The second wheel 9 is likewise provided with one hundred teeth, which are numbered consecutively from "100" to "10,000." The wheel 9 is operated at each complete revolution of the wheel 8 by a rigid drag-tooth 10, projecting radially from the wheel 8 in the path of movement of the teeth of the wheel 9, and in reading the register if the wheel or disk 9 shows "200" through the sight-opening 6 and the wheel or disk 8 "49" through the opening 7 the operator will know that two hundred and forty-nine sheep or other animals have passed over the platform 2. The lever 4 is movable through a slot 11 in the end of the casing adjacent to the connecting-rod 3, and at an intermediate point the said lever is fulcrumed on a support 12 within the casing. This support is secured to a vertical partition 13, having a lower slot 14, through which the lever extends, and an upper slot 15. On the inner end of the lever is pivotally applied an upwardly-projecting dog 16, which is held in continual engagement with the teeth of the wheel or disk 8 by a spring 17, secured to the outer edge of the dog and engaging a projection 18 on the adjacent portion of the partition 13. Back movement of the wheel or disk 8 is prevented by a spring 19, secured against the inner side of the top of the casing and projected through the slot 15. From the slot 15 the spring 19 is curved downwardly through an auxiliary intermediate support 20 and has a lower curved terminal 21 loosely bearing on the upper edge of the lever and projected through the slot 14. It will be observed that this spring performs the double function of preventing back movement of the wheel or disk 8 and of elevating the platform 2. The wheel or disk 9 is prevented from having back movement by a stop-spring 22, secured to the inner side of the end of the casing opposite that from which the lever 4 projects and continually engaging the said wheel or disk.

From the foregoing it will be seen that the disks will be regularly rotated and the depression of the outer terminal of the lever 4 will elevate the dog 16 and rotate the wheel or disk 8 the distance of one tooth, and this operation continues until the said wheel or disk has been fully rotated, when the number of sheep or other animals amounting to one hundred and registered thereby will be transferred to the wheel or disk 9.

The sheep or other animals will be driven into the chute 1 at the end of the latter opposite that having the platform 2 and permitted to pass one by one over the platform 2, thus lowering said platform and pulling downwardly on the connecting-rod 3 and operating the registering mechanism.

The improved device will be found exceptionally useful in keeping an accurate register of animals passing over the platform 2, and a great number of animals can be expeditiously counted and the register preserved with manifold advantages, especially on large stock-farms or ranches. As before indicated, the improved device is also useful in counting-corrals and in sheep shearing and dipping plants.

It will be understood that the chute may be made as long as desired and the counting capacity of the registering mechanism may be increased indefinitely.

Having thus fully described the invention, what is claimed as new is—

In a counting device of the class set forth, the combination of a chute, a platform movably attached to one end thereof, a connecting-rod attached to the platform, a lever connected with the rod, a pawl connected with the lever, a toothed wheel engaged by the pawl, a second toothed wheel adapted to be rotated by the first toothed wheel, a casing within which the toothed wheels are mounted, and a spring attached to the casing intermediate its ends, one end of the spring bearing against the periphery of the first toothed wheel and the opposite end of the spring bearing against the lever.

In testimony whereof I affix my signature in presence of two witnesses.

MITCHELL W. SAXON.

Witnesses:
B. C. Cass,
James D. Gallup.